Figure 2:
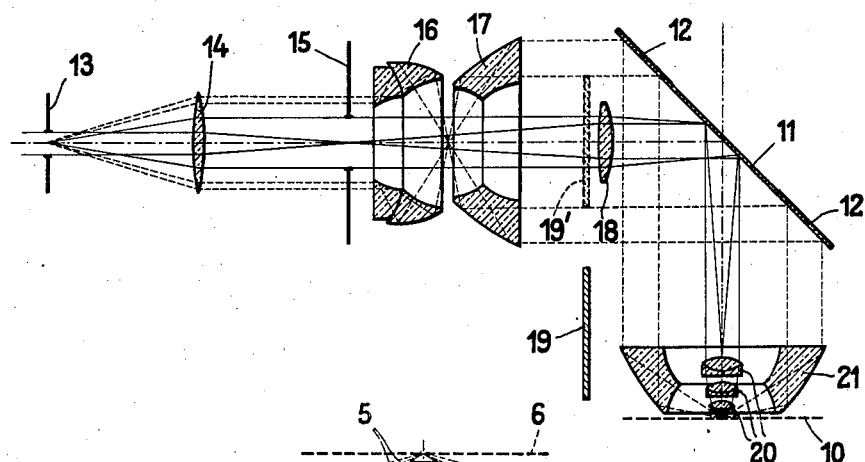

Jan. 16, 1934.   W. BAUERSFELD ET AL   1,943,510
DEVICE FOR LIGHT FIELD AND DARK FIELD ILLUMINATION OF MICROSCOPIC OBJECTS
Filed Oct. 10, 1932

Inventors:
Walther Bauersfeld.
August Köhler.

Patented Jan. 16, 1934

1,943,510

UNITED STATES PATENT OFFICE 1,943,510

DEVICE FOR LIGHT-FIELD AND DARK-FIELD ILLUMINATION OF MICROSCOPIC OBJECTS

Walther Bauersfeld and August Köhler, Jena, Germany, assignors to firm Carl Zeiss, Jena, Germany Application October 10, 1932, Serial No. 637,024, and in Germany October 15, 1931

3 Claims. (Cl. 88—40)

We have filed an application in Germany, October 15, 1931.

It is a known fact that microscopes provide special contrasts in the viewed image only when the object plane is illuminated merely in the part the image of which is to be viewed. For this reason it is convenient to illuminate, for instance, only that portion of the object plane which appears in the field-of-view diaphragm of the ocular or is imaged on the photographic plate. In the case of moderate and great microscopic magnifications, this requirement is fulfilled by imaging in the object plane, by means of the condenser system used for illumination, a diaphragm restricting the diameter of the path of illumination rays, this diaphragm being termed luminous-field diaphragm. To effect rapid changes from light-field to dark-field illumination in microscopic work, illumination devices have been suggested in which a pencil of illumination rays may be directed to the object alternatively by means of a light-field condenser and a dark-field condenser surrounding the light-field condenser in a ring-like manner, the change of illumination being effected by means of a diaphragm. The said illumination devices may be adapted to meet these requirements in the case of any kind of illumination, and this without the necessity of any difficult manipulation, by adding according to the invention the following members to the optical system: A converging optical system imaging the source of light at a great disance, a diaphragm disposed approximately in the front focal plane of this system and restricting the diameter of the ray path, an additional converging system which is traversed only by the central part of the pencil of illumination rays and images the source of light approximately in the front focal plane of the light-field condenser, the very distant image of the source of light representing the object to be imaged, and a diaphragm disposed approximately in the front focal plane of this additional system and restricting the diameter of the ray path Contrary to the illumination devices of the known kind, in connection with which it was commonly thought that any strong contrast in the images had to be dispensed with, the object of the invention provides a means which offers the desired advantage.

The device may be used both for illumination with transmitted light and illumination with incident light. From reasons not far to seek, the latter case requires either the path of the illumination rays or the path of the imaging rays of the microscope being bent by means of a reflecting system. With light-field illumination with incident light, the microscope objective used for imaging also performs the task of a light-field condenser. Care is to be taken in any case that the source of light has a luminous surface which is sufficiently uniform, and this because, otherwise, according to the position of the source of light relative to the diaphragms, the result would be either a not uniform illumination of the object or azimuthal errors. The source of light may be as well a so-called secondary source of light, that is to say the image of a light source proper which is produced by an optical system.

Applying the new illumination device for restricting the illumination field in the object plane produces the desired effect only when the condenser system used is so corrected that the diamters of the circles of diffusion which arise on account of what remains from the aberration are small as compared to the diameter of the luminous field. Owing to its simple construction, the paraboloid condenser very frequently used for dark-field illumination does not meet this requirement sufficiently, since the sine condition according to Abbe is not fulfilled when imaging by means of this condenser. The error may be eliminated, however, by so disposing in the path of the illumination rays, in front of the paraboloid condenser, another, equal, paraboloid condenser and an annular aplanatic reflecting condenser that the additional paraboloid condenser is traversed in the reverse sense by the illumination rays and that the aplanatic reflecting condenser images the source of light approximately in the front focal plane of the said additional paraboloid condenser, the distant source of light being the object to be imaged. By co-ordinating to each other two paraboloid condensers, the imaging errors peculiar to such condensers are neutralized, and the source of light is imaged in the object plane in a manner as if the aplanatic reflecting condenser had been used as a dark-field condenser. At the same time, this construction offers the advantage that the converging optical system, which images the source of light at a great distance, may be given a comparatively small diameter.

Figure 1:
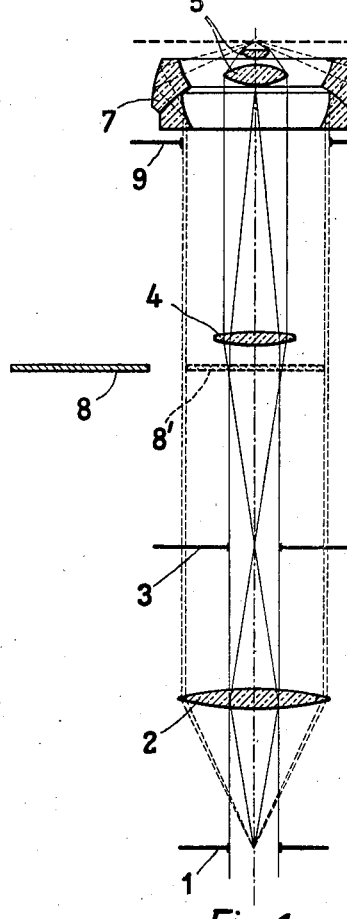

The accompanying drawing, which illustrates the invention, represents schematically, in central sections, the optical parts of two constructional examples of the new illumination device. Figure 1 shows a device for illumination with transmitted light, and Figure 2 a device for illumination with incident light.

In the first example (Figure 1), use is made of a secondary source of light. This source of light is the image of a light source proper, for instance the image of the incandescent filament of a suitable glow lamp, which is produced in any known manner in the aperture of an iris diaphragm 1. Behind the iris diaphragm 1 is disposed a converging lens 2 at such a distance that the diaphragm 1 lies in the front focal plane of the lens 2. In the rear focal plane of the lens 2 is provided an iris diaphragm 3 behind which is an additional converging lens 4. This converging lens 4, which has a free aperture smaller than that of the converging lens 2, is given such a position that its front focal plane coincides with the iris diaphragm 3 and its rear focal plane, however, with the front focal plane of an achromatic light-field condenser 5 which consists of two lenses and whose rear focal plane coincides with the object plane 6. The light-field condenser 5 is surrounded by an annular aplanatic reflecting condenser 7. Also this condenser 7 is given a position in which its rear focal plane coincides with the object plane 6. Near the converging lens 4 is a central diaphragm 8, which may be placed in the ray path, and immediately in front of the reflecting condenser 7 an iris diaphragm 9.

The light ray emanating from the margin of the aperture of the illuminated diaphragm 1, which are parallel to the axis of the illumination system, strike the lens 2 that converges them in the plane of the diaphragm 3. The rays arrive at the lens 4, which makes them parallel again, and, finally, the light-field condenser 5 causes them to converge in the object plane 6. It is obvious that, by altering the diameter of the aperture of the diaphragm 1, the aperture of the marginal rays traversing the condenser 5 may be controlled. The diaphragm 1 therefore acts relatively to the light-field condenser 5 as an aperture diaphragm. The diaphragm aperture and, consequently, the source of light are imaged by the lens 2 at a great distance. This distant image serves as an object for the lens 4, which consequently images the source of light and the aperture of the diaphragm 1 in the front focal plane of the condenser 5. The pencil of imaging rays traverses the condenser 5 from which it emanates as a pencil of parallel rays and illuminates the object plane in a circular surface of equal diameter. Contrary thereto, the aperture of the diaphragm 3, which, by permitting to influence that part of the ray pencil which emanates from the lens 2 as a pencil of parallel rays, serves for controlling the said diameter, is imaged in the object plane. In light-field illumination, the diaphragm 3 consequently represents a luminous-field diaphragm.

When it is desired to change from light-field to dark-field illumination, the diaphragm 3 is to be opened, and the central diaphragm 8 to be placed in the path of the illumination rays, the diaphragm 8 assuming the position 8', which is indicated in the drawing by dash-lines. Provision may be made that the two movements may be effected simultaneously by one single manipulation. When both kinds of illumination are to act simultaneously, the diaphragm may, of course, not be applied. By inserting the diaphragm 8, the lens 4 is caused to be without any effect, the consequence being that the aperture of the diaphragm 1, which is imaged by the lens 2 at a great distance, is imaged by the reflecting system 7, to which the imaging rays are directed as parallel rays, in the object plane 6. In this case the diaphragm 1 obviously represents a light-field diaphragm. Contrary thereto, the diaphragm 3 might be caused to influence the marginal rays of the pencil of parallel imaging rays. In other words, the diaphragm 3 might be used as an aperture diaphragm for the dark-field condenser 7. Applying the diaphragm 3 in this manner, however, is not advisable, since the diaphragm 3 is at a comparatively great distance from the reflecting condenser 7 and, therefore, would be imaged by this condenser at a comparatively short distance from the object plane 6. For this reason it is advisable to use for controlling the aperture of the dark-field illumination the diaphragm 9 which lies near the condenser 7 and is imaged at a great distance owing to its proximity to the front focal plane of the condenser 7.

Contrary to the above described first constructional example, in which the observation of the object plane is effected from the side not facing the illumination, the object plane 10 of the second constructional example (Figure 2) is illuminated and viewed from one and the same side. For this reason, the path of the illumination rays is to be separated from the path of the imaging rays in the manner usual with vertical illuminators. This separation is effected by a glass plate 11 which is inclined at an angle of 45° relatively to the path of the illumination rays. While the central part of the glass plate 11 is not silvered, the annular part surrounding this central part has a reflecting layer 12. The light source is represented by the illuminated aperture of an iris diaphragm 13 which corresponds to the diaphragm 1 of the first example. Similarly to the first example, a converging lens 14 is so provided behind the diaphragm 13 that the front focal plane of the lens 14 coincides with the plane of the diaphragm 13. In the rear focal plane of the lens 14 is disposed an iris diaphragm 15 which is closely followed by an aplanatic reflecting condenser 16 of annular form. The rear focal plane of this reflecting condenser 16 coincides with the front focal plane of a paraboloid condenser 17 which is also of annular form, the vertex of the paraboloid surface of this condenser 17 facing the light entrance. Behind this paraboloid condenser 17 is disposed a converging lens 18 and the glass plate 11, which is inclined at an angle of 45° relatively to the illumination system. Near the lens 18 is a central diaphragm 19 that may be inserted into the ray path. The light-field condenser is represented by a microscope objective 20 which produces a microscopic image of the illuminated part of the object plane 10. The microscope objective 20 is given such a position that its rear focus lies in the object plane 10. With this focus coincides the rear focus of the dark-field condenser 21 surrounding the microscope objective 20 in a ring-like manner and equalling the paraboloid condenser 17. The paraboloid condenser 21 is so arranged in the usual manner that its paraboloid vertex is on the side of the light entrance.

When using the system according to the second constructional example for light-field illumination, the illumination rays have directions corresponding to those of the first example, the difference being that a partial reflection takes place at the not silvered medial parts of the glass plate 11 which causes the axis of the illumination rays to be deviated at a right angle. This part of the glass plate 11 provides at the same time a passage for the imaging rays. To change to dark-field illumination, the central diaphragm 19 is brought back into the position 19' represented in the drawing by dash-lines, and the diaphragm 15 is opened. Also the second example naturally permits to use both kinds of illumination simultaneously when the diaphragm 19 is not applied. The light rays emanating from the source of light, that is to say from the aperture of the diaphragm 13, are changed by the lens 14 to a pencil of parallel rays. The lens 14, whose free aperture is substantially smaller than that of the lens 2 of the first example, directs the said rays to the aplanatic condenser 16, which causes them to converge at its rear focal plane. By the paraboloid condenser 17, the light rays are directed as a pencil of parallel rays to the annular reflector 12 which deviates them at a right angle. The paraboloid condenser 21 causes the rays to converge in the object plane 10. Contrary to the light-field illumination, in which the diaphragm 13 serves as an aperture diaphragm and the diaphragm 15 as a luminous-field diaphragm of the pencil of the illumination rays, the dark-field illumination makes the diaphragm 13 represent the light-field diaphragm, and the diaphragm 15 the aperture diaphragm. In this case, the diaphragm 15 may be used without fearing any disturbance, since this diaphragm is very near the condenser 17. Imaging the source of light in the object plane 10 is effected with that degree of correctness which is peculiar to the condenser 16, and this because the two paraboloid condensers facing each other, 17 and 21, mutually neutralize the defects of their images.

We claim:

1. A device for illuminating microscopic objects alternatively in a light and in a dark field, comprising a converging optical system, a diaphragm disposed in the front focal plane of this system, another converging system provided behind the first said system and adapted to receive the light rays traversing the central part of the first said system, a light-field condenser, the front focal plane of the light-field condenser coinciding approximately with the rear focal plane of the said other system, another diaphragm disposed in the front focal plane of the said other optical system, a third diaphragm, this third diaphragm being removable and adapted to stop down the central part of the rays having traversed the first said converging system, and an annular dark-field condenser surrounding the light-field condenser.

2. A device for illuminating microscopic objects alternatively in a light and in a dark field, comprising a converging optical system, a diaphragm disposed in the front focal plane of this system, another converging system provided behind the first said system and adapted to receive the light rays traversing the central part of the first said system, a light-field condenser, the front focal plane of the light-field condenser coinciding approximately with the rear focal plane of the said other system, an iris diaphragm disposed in the front focal plane of the said other optical system, a third diaphragm, this third diaphragm being removable and adapted to stop down the central part of the rays having traversed the first said converging system, and an annular dark-field condenser surrounding the light-field condenser.

3. A device for illuminating microscopic objects alternatively in a light and in a dark field, comprising a converging optical system, a diaphragm disposed in the front focal plane of this system, another converging system provided behind the first said system and adapted to receive the light rays traversing the central part of the first said system, a light-field condenser, the front focal plane of the light-field condenser coinciding approximately with the rear focal plane of the said other system, another diaphragm disposed in the front focal plane of the said other optical system, a third diaphragm, this third diaphragm being removable and adapted to stop down the central part of the rays having traversed the first said converging system, a paraboloid condenser surrounding the light-field condenser, another paraboloid condenser disposed in front, and having a position reverse to that of the first said paraboloid condenser, and an annular aplanatic reflecting condenser disposed in front of the said other paraboloid condenser and adapted to image in the front focal plane of the said other paraboloid condenser the diaphragm lying in the front focal plane of the first said converging system.

WALTHER BAUERSFELD.
AUGUST KÖHLER.